United States Patent

[11] 3,632,316

[72] Inventor  Hans Kluge
              Essen-Huttrop, Germany
[21] Appl. No. 830,260
[22] Filed     June 4, 1969
[45] Patented  Jan. 4, 1972
[73] Assignee  Steinkohlen-Elektrizitat AG
              Essen, Germany
[32] Priority  June 6, 1968
[33]           Germany
[31]           P 17 67 700.8

[54] PROCESS FOR PRODUCING HEAVY WATER
     3 Claims, 1 Drawing Fig.
[52] U.S. Cl. ........................................ 23/307,
                                                    159/4 CC
[51] Int. Cl. ........................................ B01d 1/02
[50] Field of Search ........................ 159/4 A, 4
     CC, 4 R, 13 C, 31; 203/DIG. 8, DIG. 20, 21, 22,
     25, 5; 55/223; 261/151, 160; 23/204; 60/94, 95,
     96; 165/50; 62/305, 310

[56]              References Cited
             UNITED STATES PATENTS
2,756,029  7/1956  Brogdon ...................... 159/48 X
2,838,135  6/1958  Pilo et al. ................... 261/151 X
3,397,123  8/1968  Cull ............................ 203/49
2,103,542  12/1937  Mart ........................... 62/305 X
             FOREIGN PATENTS
547,124    5/1956  Belgium ...................... 62/305
601,397    3/1926  France ....................... 62/310

Primary Examiner—Norman Yudkoff
Assistant Examiner—J. Sofer
Attorney—Karl F. Ross ABSTRACT: A process for producing heavy water using the waste heat of a steam turbine electricity-generating plant wherein a circulation of cooling water is passed through the condenser of the electrical generating plant and is in turn cooled in a cooling tower, above the trickle body of which is provided a deuterium oxide separating column or stage in which the lower boiling-point component of the water, namely, $H_2O$, is preferentially evaporated while the deuterium oxide falls into a collecting vessel.

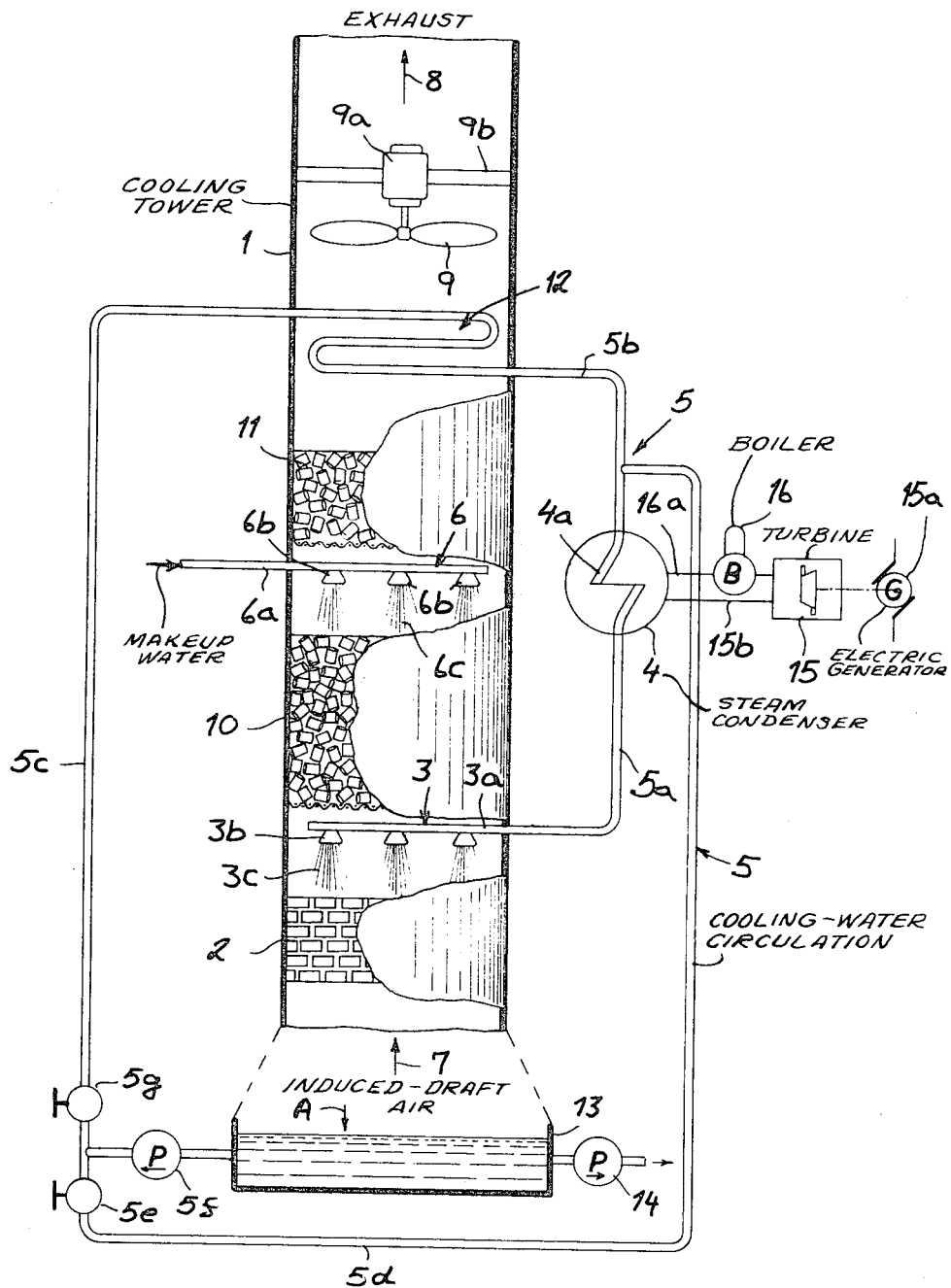

PROCESS FOR PRODUCING HEAVY WATER

The present invention relates to a process for producing deuterium oxide in the form of an increased concentration of $D_2O$ in $H_2O$ and, more particularly, to a process and apparatus for increasing the concentration of deuterium oxide in water, using the waste heat of the recycled cooling water of a electric power generating installation.

Heavy water ($D_2O$) is a desirable component of nuclear reactor installations, for use as a moderator or cooling agent as a consequence of its neutron cross section. Such heavy water is, however, relatively expensive because its separation or recovery from ordinary water is difficult and methods of producing it have hitherto concentrated upon recovery of deuterium from gas streams consisting of mixtures of hydrogen and deuterium obtained by electrolysis or otherwise produced from the elements.

In normal water, the concentration of $D_2O$ or heavy water is distributed substantially uniformly throughout the crust of the earth in an amount of about 0.015 percent.

To recover 1 kg. of heavy water, therefore, it is theoretically necessary to process 10 tons of normal water. Since the chemical characteristics of deuterium oxide and many of the physical properties of deuterium oxide approach closely those of $H_2O$, chemical separation techniques and most physical separation processes are scarcely plausible for the separation of deuterium oxide from ordinary water or even the concentration of deuterium oxide in ordinary water.

However, since the boiling-point difference between the two components at standard pressure (760 mm. Hg) is about 1.4° C., distillation techniques have been proposed heretofore to increase the concentration of heavy water in $H_2O$. Because the physical characteristics of the $H_2O/D_2O$ system is of a eutectic nature, the reflux ratio of the two components is about 10. Hence 10 times more normal or ordinary water must be vaporized to obtain the theoretical quantity of deuterium oxide. In numerical terms, about 100 tons of normal water must be distilled in order to obtain 1 kg. of deuterium oxide by distillation methods. If one assumes a vaporization-heat requirement of about 500 kcal./kg. for the distillation of this quantity of normal water, it can be seen that about 50 million ($50 \times 10^6$ 1 kg.

of deuterium oxide. This thermal requirement makes distillation techniques for recovering heavy water from normal water, in which the deuterium oxide is present in the proportion normally found therein, i.e., about 0.015 percent, economically unfeasible; indeed, prior art distillation processes for the recovery of heavy water have not found practical realization.

It is, therefore, the principal object of the present invention to provide an improved process for recovering heavy water from normal water or concentrating heavy water in normal water.

Another object of this invention is to provide a process for recovering heavy water, in the form of a concentrated solution thereof in $H_2O$, which is economically plausible on a large scale and which avoids the disadvantages enumerated above.

Still further, it is an object of this invention to provide an apparatus for producing heavy water in an economical and rational manner.

The present invention is based upon the recognition that electric power generating installations and especially steam power installations, whether utilizing as a heating source fossil fuel or nuclear reaction, are provided with steam or feedwater recycling systems in which a condenser is provided between the output side of the steam-driven machine (e.g., a steam turbine) and the boiler in which the recycled fluid is reheated.

Such condensers increase the efficiency of the steam-operated electrical power installation and maintain the purity of the recycled fluid so that contamination of the boiler and of the turbine does not occur.

A circulation of a cooling liquid through the condenser is used to dissipate the sensible heat of the depleted steam leaving the turbine, the cooling liquid being in turn cooled by the transfer of heat to atmospheric air in cooling towers and the like.

The cooling-water circulation is provided with means for adding water (makeup water) to the cycle to make up for losses caused by the transfer of moisture to the cooling air. Heretofore, the thermal energy dissipated in the cooling tower could not be economically used. In general, the thermal energy dissipated in the condenser to the recycled cooling liquid was invariably dissipated into the atmosphere at considerable cost.

It has now been found to be possible to eliminate the aforementioned disadvantages and attain the aforementioned objects by utilizing the waste heat of an electric power generating installation to concentrate heavy water in ordinary water.

More particularly, it has been found that it is possible to concentrate deuterium oxide in normal water by using the ordinary recycle cooling system provided for such power-generating installations.

According to a feature of the invention, the waste heat of the recycle cooling system is exploited in the recycle cooling tower and the cooling-water circulating system to recover heavy water by subjecting the moisture-saturated cooling air, leaving the cooling stage of the cooling tower, in a subsequent zone in its upward path through the tower, to a separation type of distillation in which the more readily boiling ($H_2O$) component is preferentially transferred to the cooling air while the higher boiling deuterium oxide component is preferentially recovered in liquid form.

In the system of the present invention, there is provided a trickle body above the cooling stage, which is a trickle tower of conventional type, in the form of a high surface area separation zone through which the moisture-saturated cooling air is passed in counterflow to the trickle of additive water used to replace the moisture loss to the air.

In this zone, which is maintained at a temperature corresponding substantially to the boiling point of the lower boiling ($H_2O$) component at the pressure within the tower, the downward trickle of the additional water, provided from a water distributor above the separating trickle body, flushes the deuterium oxide accumulating upon this body downwardly in a collected water solution while the moisture-laden air has proportionally reduced deuterium oxide content as it leaves this body. In other words, the second stage of the cooling tower constitutes a region in which intimate contact between the water film on the trickle body and the cooling air is sustained at a temperature and pressure such that the deuterium oxide preferentially is retained in this film while the moisture within the cooling air traversing this trickle body has a diminished deuterium oxide content.

According to another feature of this invention, to augment the effect just described, a concentrating zone is provided above the separation zone in which the moisture-laden air is again passed in intimate contact with a trickle of liquid produced by a condenser forming part of the cooling-liquid recirculation path in a refluxing arrangement. In this final zone, therefore, the water vapor/air mixture leaving the separating zone is passed into a reinforcing or concentrating zone in which the residual deuterium oxide content is in part washed from this mixture with deuterium oxide-depleted water produced by condensing moisture from the water vapor/air mixture above the reinforcing zone. It is this condensed moisture which forms the refluxing trickle adapted to carry at least part of the deuterium oxide into the underlying separation zone.

It is important, according to this invention, to provide in both the separating zone and in the overlying zone a high surface area for intimate contact between the liquid film formed on the trickle body and the arising gas steam. The trickle body is thus constituted by a filler of Raschig rings or other packing material with high surface area and proportionately high flow cross section, or with checkerworks, lattice structures or the like whose surface area may be higher than the trickle boards or checkerwork provided in the cooling stage below the separating zone. Such packings are described in Mark's Mechanical Engineers' Handbook and Perry's Chemical Engieers' Handbook cited below. The deuterium oxide-enriched water may be then withdrawn from the cooling water circulation at a substantially constant rate.

The principal advantage of the present process is that the relatively inexpensive and conveniently available waste heat of the recycle cooling portion of an electric power installation can be used readily for the recovery of heavy water in the form of an increased concentration thereof in ordinary water and that the expensive energy requirements of conventional distillation processes are eliminated.

As noted above, it is an aspect of this invention to provide an improved apparatus for carrying out the above-described method, this apparatus consisting of a recycling system for the cooling water of an electric power installation in which the thermal energy of the depleted steam is transferred to the cooling water in the usual condenser arrangement of this installation. The recycle path is provided with a cooling tower in tandem with a distillation arrangement in which the deuterium oxide concentration of the recycled liquid is increased by reflux action and high surface area separation achieved by treating the moisture-laden air with the additive water normally required to replace the moisture lost in the cooling tower.

The above and other objects, features, and advantages of the present invention will become more readily apparent from the following description, reference being made to the accompanying drawing, the sole FIGURE of which is a diagrammatic representation, in vertical cross section, of a cooling tower for a power station of the steam turbine type designed to produce water enriched in deuterium oxide (heavy water).

In the drawing, there is shown a cooling tower whose outer shell is represented at 1 and which is provided with a trickle mass 2 of checkerwork, lattice construction, or baffles, along the surface of which a descending water film is able to contact a rising airstream which enters the tower from below as represented at 7. In the embodiment illustrated in the drawing, the tower is of the induced-draft type, some design aspects of which are discussed in chapter 15 of Perry's Chemical Enginners' Handbook, fourth edition, McGraw-Hill Book Company, N.Y. 15–14 to 15–19, and the references there cited. Similar cooling towers are described also at pages 9–102 ff. and 4–90 ff. of Mark's Mechanical Engineers' Handbook, McGraw-Hill Book Company, N.Y., 2nd edition.

Above the trickle mass 2, there is provided a water distributing and dispensing means 3, represented by a transverse duct 3a carrying an array of downwardly directed supply heads 3b dispensing finely divided generally conical water jets 3c downwardly onto the trickle bodies 2. The water-dispensing means 3 is connected to a pipe 5a forming part of the cooling-water circulating path for the condenser installation 4 of an electric power station of the turbine type, represented generally at 15 and 16.

In such a system, omitting all structure and apparatus immaterial to the present invention, the generating plant includes a steam turbine 15 coupled with a generator 15a and receiving the driving steam from a heating plant 16, the latter being of the fossil fuel or nuclear reactor type. At the low pressure side of the turbine, a duct 15b carries depleted steam to the condenser 4 at which the depleted steam is cooled and condensed so that relatively uncontaminated water is recycled to the steam boiler via line 16a from the condenser 4. A typical condenser for the purposes of the present invention is described at pages 9–102 of Mark's Mechanical Enginers' Handbook (op. cit.).

Additional water is added to the recirculating system via a spray arrangement shown generally at 6 and including a duct 6a feeding the spray heads 6b which produces downwardly directed conical jets 6c of finely divided water.

The cooling-water circulating path 5 comprises a line 5d leading from the collection vessel 13 of the liquid water below the trickle body 2 and a circulating pump 5f through a valve 5e to the input side of the coil 4a of the condenser 4. The output line 5a is connected to the spray nozzles 3b via duct 3a as previously noted. In addition, the pump 5f also feeds a line 5c via a valve 5g which is connected to a refluxing condenser 12 within the tower 1 above the reinforcing trickle body 11 prior to passing into the line 5b for return to the input side of the coil 4a of condenser 4.

Above the reflux coil 12, there is provided a blower 9 for forced draft through the tower 1 to draw air upwardly through the several trickle bodies 2, 10, and 11 prior to dissipating the moisture-laden air to the atmosphere as represented by arrow 8. The blower 9 is driven by an electric motor 9a supported within the tower 1 as shown at 9b. Thus the cooling tower of the electric power installation according to the present invention, which may be operated by thermal convection of both the liquid and of the gas medium, simultaneously forms a distillation column for concentrating heavy water in the liquid collected within the vessel 13. The distillation arrangement includes, above the trickle body 2 for the normal recycle cooling of the liquid and its water-distributing arrangement 3, a separating column 10 for the cooling air saturated with water passing upwardly through the cooling stage. Above the separating trickle mass 10, which may be a packing of Raschig rings or the like, is provided the spray arrangement 6 for dispersing the additive water, i.e., the water necessary to make up the recycled cooling liquid upon transfer of moisture to the air leaving the column at 8.

With the reinforcing or concentrating packing 11, constituting the uppermost trickle body of the present invention, is not essential, it has been found to be highly desirable for use in conjunction with the reflux condenser 12. Consequently above the additive-water dispensing arrangement 6, the trickle body 11 is provided for traversal in the upward direction by the moisture-laden air leaving the separating trickle body 10. The moisture condensed by the cooling coil 12 trickles downwardly through the body 11 in intimate contact and over large surface area with the rising moisture-laden stream of air. The separating column 10 and the concentrating column 11 are here shown as built into the correspondingly lengthened cooling tower shell 1, but may in practice be provided in a separate column on top of the normal cooling column.

The water vapor-saturated cooling air of the cooling tower serves to drive off the easily boiling ($H_2O$) component of the additive water sprayed at 6b from the dispenser 6 and cascading downwardly over the high surface area of the trickle body 10 in intimate contact with the rising moisture-laden stream of air.

As a result, the $D_2O$ content of the water collected in vessel 13 in enriched and, in general, the $D_2O$ content of the recycled cooling liquid passing along the path 5 is increased. In other words, the column simultaneously acts as a distillation column which admits of a reduction of the partial pressure of the mixture to be separated by the use of an inert gas, i.e., the moisture-laden air passed through the cooling column. By the reduction of the partial pressure of the components to be separated, the separation effect is increased in accordance with known distillation technology. From the water vapor/air mixture of the separating column 10, deuterium oxide-depleted water is precipitated by the condensing arrangement 12 and trickles through the concentrating column 11 to further remove deuterium oxide from the moisture-laden air and carry it in a liquid film into the separating column 10. Here, too, there is an augmentation of the separating effect.

In operation, therefore, the recycled cooling water heated in condenser 4 flows into the cooling tower through the water-distributing and spray arrangement 3 and trickles through the trickle body 2 downwardly in counterflow to a rising stream of cooling air. The latter takes up the sensible heat of the cooling water which in part collects in the vessel 13. The remainder of the cooling water is transformed into water vapor which is carried by the rising and warmed airstream upwardly, the airstream being saturated with the water vapor. The water vapor content of the warmed air is, of course, established by proper adjustment of the water temperature of the recycled coolant upon leaving the condenser 4 and the quantity and temperature of the cooling air introduced in the tower at 7. Up to this point, the tower 1 and the recycle system function as the usual cooling arrangement for the electric power installation 15, 16.

As the warmed, moisture-saturated air passes further through the separating column 10 with a moisture content corresponding to the partial pressure determined by the air temperature, it passes in intimate contact with liquid water trickling over the packing 10 in an amount identical to the quantity which is carried upwardly by the airstream. The more readily boiling component, $H_2O$, of the downwardly trickling liquid is preferentially driven therefrom and increases the vapor content of the air while the less readily boiling component, $D_2O$, enriches the liquid phase. Above the separating column or zone 10, the additive water is dispensed by the arrangement 6 in accordance with the teachings of the present invention.

The deuterium oxide concentration of the water vapor above the separating column 10 corresponds to that originally in the additive water as the water vapor/air mixture rises further through the concentrating column or zone 11 in which the $H_2O$ concentration is augmented. In this zone, deuterium oxide depleted water, produced by condensation along the coil 12, trickles downwardly through the body 11 to wash deuterium oxide to a limited extent from the rising water vapor and is thus enriched with deuterium oxide. The deuterium oxide depleted water vapor is in part condensed and the remainder, corresponding to the water vapor normally leaving the cooling tower of an electrical power installation, is discharged with the air at 8. The reflux condenser 12 is, or course, cooled with the recirculated water collected in vessel 13. This water is slightly warmed in the reflux condenser 12 and then enters the condenser 4 wherein it is further heated while dissipating the waste heat of the power station, the heated water being returned to the spray nozzles 3b as previously described. The recycled water drawn from the condenser 4 is, of course, at a higher temperature than that removed from a condenser installation in a system of conventional type in which deuterium oxide recovery is not desired. It is equally evident that this increased temperature signifies an increase of the condenser pressure which corresponds to a slight reduction in the efficiency of operating the turbine or an increase in the specific steam consumption thereof. This decrease in efficiency of about 10 percent, corresponds to the thermal requirements for deuterium oxide recovery in the installation. As a matter of fat, however, the system remains economical since the 50 million kcal./kg. of deuterium oxide theoretically necessary as noted above and required by conventional distillation arrangements is reduced by a factor of 10 to approximately 5 million kcal./kg. of deuterium oxide.

It is found that the process of the present invention allows an increase of the deuterium oxide concentration of the water to about 1 percent so that the cooling-water circulating path is generally operated under substantially steady state conditions with a liquid containing 1 percent deuterium oxide. The liquid is continuously withdrawn at 14. For this reason, the quantity of water added at 6 is increased so that the equivalent of 99 percent thereof is carried off as deuterium oxide-depleted water vapor into the atmosphere while the balance of 1 percent is withdrawn continuously at 14 as deuterium oxide-enriched water. When the bypass 5d, 5e is employed, the cold water drawn from the vessel 13 is passed directly into the condenser 4 to operate the power-producing installation with higher efficiency. In accordance with this invention, the bypass is used for peak loads of the steam turbine arrangement.

What is claimed is:

1. A cooling tower for a steam-operated electric power generating installation having a condenser adapted to transfer heat to a recycled cooling water, said tower comprising:
   means for admitting a cooling airstream into the tower at a lower portion thereof and for discharging said cooling airstream after upward traversal of said tower at an upper portion thereof;
   a first trickle body in said tower traversed by said cooling airstream and a water-distributing means above said trickle body for dispensing recycled cooling water derived from said condenser onto said first trickle body, thereby warming said airstream and substantially saturating same with moisture while cooling the recycled water;
   a second trickle body forming a separating stage above said dispensing means for traversal with the moisture-saturated warmed airstream;
   second dispensing means above said trickle body for distributing additive water over said second trickle body in intimate contact with the warmed gas stream, thereby enriching the additive water with deuterium oxide while preferentially vaporizing $H_2O$ into said airstream;
   means below said trickle bodies for collecting liquid water passing downwardly therethrough and enabling recycling thereof through said condenser;
   a third trickle body above said second dispensing means and traversed by the gas stream saturated with moisture depleted in deuterium oxide; and
   condenser means above said trickle body for condensing moisture from the airstream prior to its discharge at said upper portion and passing the condensed water downwardly through said third trickle body to wash deuterium oxide from the airstream rising therethrough.

2. The cooling tower defined in claim 1, further comprising blower means for inducing the flow of cooling air upwardly through said tower.

3. The cooling tower defined in claim 2, further comprising conduit means for controllably passing water from said collecting means selectively to said condenser means above said third trickle body and directly to said condenser of said installation.

* * * * *